United States Patent [19]

Vanderheyden

[11] 3,995,336
[45] Dec. 7, 1976

[54] SPRING MATS

[76] Inventor: Herman E. Vanderheyden, 6e Loveldlaan 24, 9880 Aalter, Belgium

[22] Filed: Aug. 22, 1975

[21] Appl. No.: 606,947

[30] Foreign Application Priority Data

Sept. 9, 1974 Belgium .............................. 819439

[52] U.S. Cl. ...................................... 5/263; 5/256; 5/268
[51] Int. Cl.² ........................................ A47C 23/04
[58] Field of Search ....................... 5/256, 263–268, 5/347, 351; 38/66, 68, 140

[56] References Cited
UNITED STATES PATENTS

| | | | |
|---|---|---|---|
| 2,708,322 | 5/1953 | Frances | 5/351 |
| 3,766,578 | 11/1973 | Toupal | 5/263 |
| 3,854,157 | 12/1974 | Trimble | 5/263 |

*Primary Examiner*—Casmir A. Nunberg
*Attorney, Agent, or Firm*—Browdy and Neimark

[57] ABSTRACT

This invention relates to a spring mat, more particularly intended for the manufacture of resilient surfaces, which comprises substantially a series of known spring elements connected with each other into a cloth or a mesh work, each of said elements consisting of a single wire of spring steel which is bent to present a series of mutually parallel spiral pairs, each pair consisting of two substantially coaxial spirals, namely a raising spiral and a descending spiral, a metal strip being additionally inserted through all the spiral pairs of each spring element.

8 Claims, 3 Drawing Figures

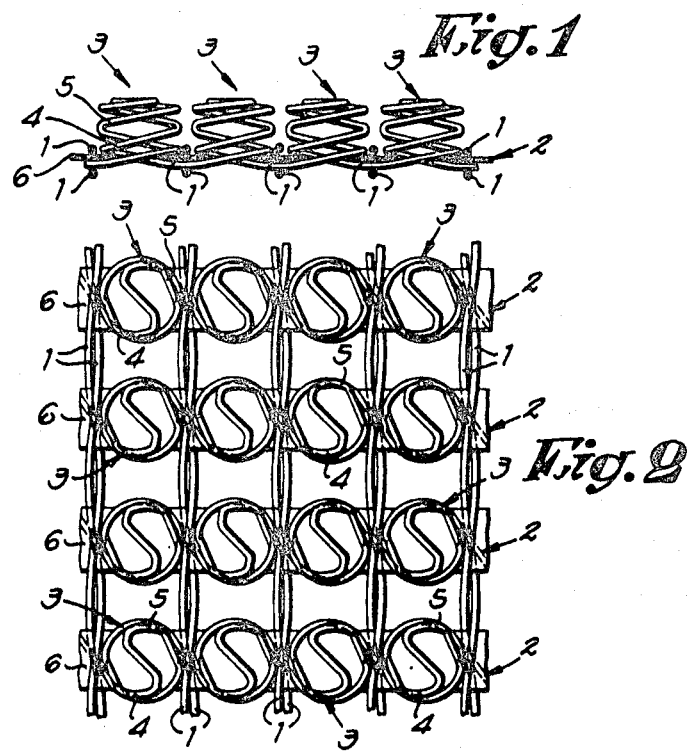
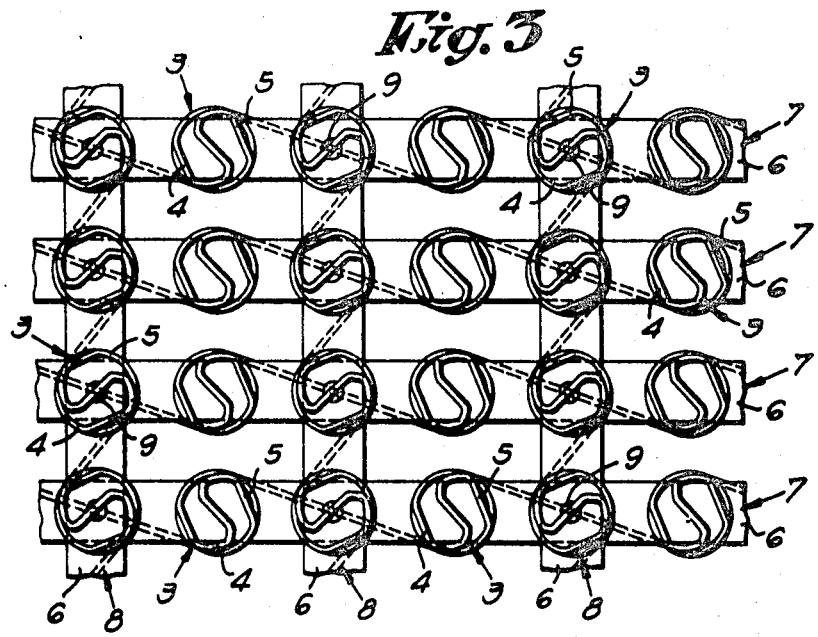

SPRING MATS

BACKGROUND OF THE INVENTION

This invention relates to a spring mat being used for the manufacture of resilient surfaces.

Such surfaces are required in various machines, e.g. in ironing machines and the like.

A known means for forming such resilient surfaces comprises spring elements consisting each of a single wire of spring steel which is bent to present a series of mutually parallel spiral pairs, each pair comprising two substantially coaxial spirals or a raising spiral and a descending spiral. Generally, a metal strip is inserted through the successive spiral pairs. Such spring elements are described, e.g. in the U.S. Pat. No. 2,708,322.

These spring elements are very difficult to handle and their fixation on the desired bearing surface is time consuming and expensive.

Heretofore, the intended resilient surfaces are also manufactured to size in specialized works.

SUMMARY OF THE INVENTION

The object of the present invention is to provide a solution to the above-described problem.

For this purpose, there is proposed a spring mat consisting essentially of a series of spring elements known per se which are mutually connected to form a cloth or a mesh work.

This spring mat may be manufactured according to standard dimensions to be subsequently cut to size in accordance with the resilient surface being formed.

The fixation of such a mat on a bearing surface may be carried out rapidly and readily, e.g. by spot welding.

BRIEF DESCRIPTION OF THE DRAWING

The features and characteristics of this invention will be better pointed out by the following detailed description of two embodiments given by way of example, reference being made to the enclosed drawings in which:

FIGS. 1 and 2 show respectively a side view and a top view of a spring mat according to the invention, and FIG. 3 is a top view of a modified embodiment.

DETAILED DESCRIPTION OF THE PREFERRED EMBODIMENTS

In the example represented in FIGS. 1 and 2, the spring mat according to the invention comprises a cloth the warp 1 of which consists, e.g. of metal wire, while the weft consists of spring elements 2.

As indicated above, the latter are known per se. They comprise each a single wire of spring steel bent under the form of a series of mutually parallel spiral pairs 3. Each pair 3 comprises a raising spiral and a descending spiral 4 and 5 respectively which are substantially coaxially disposed. A descending spiral 5 of a pair 3 is connected with the raising spiral 4 of the following pair and vice versa.

A metal strip 6 is inserted through the spiral pairs.

In a modified embodiment according to FIG. 3, a mesh work consisting of spring elements is manufactured.

The distance between the center lines of two successive spiral pairs of the spring elements 7 oriented horizontally in the drawing is two times longer than the distance between the spiral pairs of the other vertical elements 8. The latter are connected with the elements 7 by spot welding (welding spots 9).

Of course, in order to manufacture spring mats according to the invention, there are other possibilities than those described hereabove by way of example. Thus, e.g. in the strip 6, a series of mutually parallel spring elements could be connected with each other by wires welded thereon or similar.

Of course, the number of spiral pairs per surface unit of the mat may be selected in accordance with the intended use.

What I claim is:

1. A spring mat having a weft and a warp, more particularly intended for the manufacture of resilient surfaces, comprising, in combination: a series of known spring elements, each of said elements consisting of a single wire of spring steel which is bent to present a series of mutually parallel spiral pairs, each pair consisting of two substantially coaxial spirals, namely a raising spiral and a descending spiral, a cloth or mesh work connecting said elements together comprising said warp and, metal strips additionally respectively inserted through all the spiral pairs of respective ones of said spring elements which, with at least some of said metal strips form said weft.

2. A spring mat according to claim 1, which is manufactured as a cloth having a weft and a warp, said elements with at least some of said metal strips forming the weft of the cloth, while metal wire forms the warp of the cloth.

3. A spring mat according to claim 1, which is manufactured as a mesh work from a series of said spring elements arranged in a crossed pattern.

4. A spring mat according to claim 3, wherein said spring elements are connected in the crossed pattern with each other by welding spots.

5. A spring mat according to claim 4, wherein said cross pattern is formed by a first group of said spring elements arranged in a given direction and a second group of said spring elements arranged in a direction substantially perpendicular to said given direction, each of said spring elements of said first group having center lines of adjacent spiral pairs spaced apart at substantially twice the distance of center lines of adjacent spiral pairs of said second group.

6. A spring mat according to claim 5, wherein each said spring element of said group is welded to each said spring element of said second group.

7. A spring mat according to claim 1, wherein said mesh work consists of a warp formed by elongated members of generally circular cross section laced over and under said spring elements and said metal strips, said elongated members being positioned between said parallel spiral pairs.

8. A spring mat according to claim 5, wherein said elongated members consist of a metal wire.

* * * * *

UNITED STATES PATENT AND TRADEMARK OFFICE
CERTIFICATE OF CORRECTION

PATENT NO. : 3,995,336
DATED : December 7, 1976
INVENTOR(S) : Herman E. Vanderheyden It is certified that error appears in the above-identified patent and that said Letters Patent are hereby corrected as shown below:

[30] Foreign Application Priority Data "September 9, 1974"

should read --September 2, 1974--

Signed and Sealed this

Twenty-fifth Day of October 1977

[SEAL]

Attest:

RUTH C. MASON
Attesting Officer

LUTRELLE F. PARKER
Acting Commissioner of Patents and Trademarks